Nov. 11, 1952 — A. H. RUTHMAN ET AL — 2,617,669
CIRCULATOR
Filed May 14, 1948
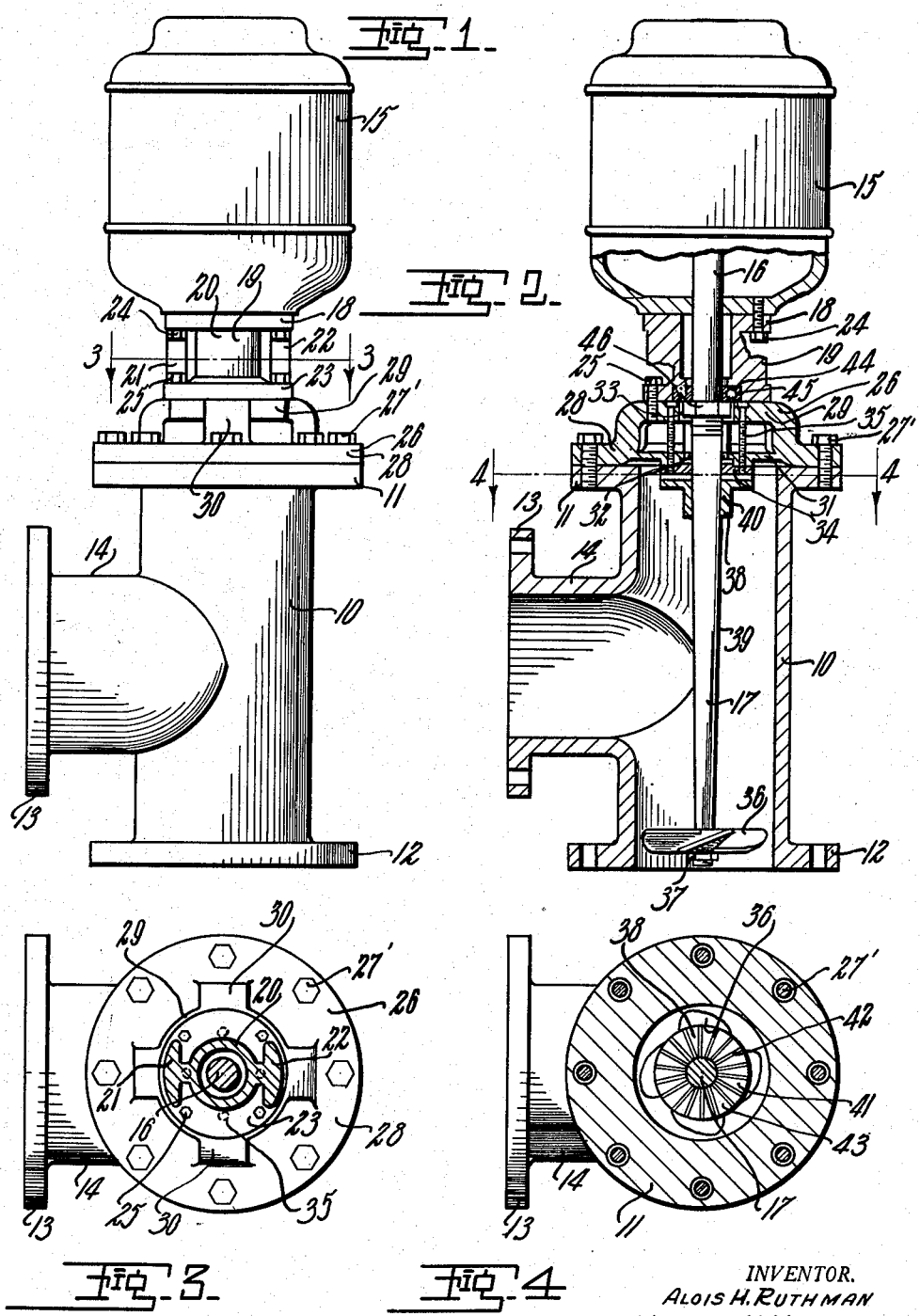
INVENTOR.
ALOIS H. RUTHMAN
WILLIAM H. MAHANEY
BY Joseph A. Rave
ATTY.

Patented Nov. 11, 1952

2,617,669

UNITED STATES PATENT OFFICE 2,617,669

CIRCULATOR

Alois H. Ruthman and William H. Mahaney, Cincinnati, Ohio, assignors to The Ruthman Machinery Company, Cincinnati, Ohio, a corporation of Ohio Application May 14, 1948, Serial No. 27,108

2 Claims. (Cl. 286—9)

This invention relates to improvements in a circulator or agitator for liquids and fluids and particularly to such a circulator or agitator wherein use is made of a slinger type seal.

Slinger type seals of themselves are old but those heretofore have had inherent drawbacks, one of which was the inability to prevent leakage or escape from the housing of the liquid when said slingers were substantially submerged in the liquid and only handled the liquid that crept upward along the impeller or agitator shaft to the said seal. In the past slinger type seals have been produced which have had their active surface on their upper surface only which would allow the liquid in the housing that seeped over the upper surface thereof to escape along the shaft from the said housing. The device of the present invention has active surfaces on both the undersurface as well as the upper surface and therefore prevents the liquid from getting past the seal along the shaft and at the same time is usable even when submerged.

The principal object of the present invention is the provision of an improved slinger type seal for a circulator or agitator for use in a closed system and which seal would prevent leakage from the circulator or agitator housing.

Another object of the present invention is the provision of an improved agitator or circulator as set forth above that is of the self contained type and including means to prevent damage to the motor by leakage of liquid from the circulator or agitator housing and to make the operator aware of the fact if such leakage is occurring.

Other objects and advantages of the present invention should be readily apparent by reference to the following specification considered in conjunction with the accompanying drawings forming a part thereof and is it to be understood that any modifications may be made in the exact structural details there shown and described, within the score of the appended claims, without departing from or exceeding the spirit of the invention.

In the drawings:

Fig. 1 is a vertical elevational view of the circulator including the improvement of this invention.

Fig. 2 is a view similar to Fig. 1 partly in section and partly in elevation to illustrate the construction thereof.

Fig. 3 is a sectional view taken transversely of the device on line 3—3 on Fig. 1.

Fig. 4 is a transverse sectional view taken in a plane lower than Fig. 3 on line 4—4 on Fig. 2.

Throughout the several views of the drawing similar reference characters are employed to denote the same or similar parts.

The circulator of the present invention consists of a body member 10 and a motive force with the said body member 10 conveniently taking the form of a flanged T having a flange 11 at the point of connection with the motive force. At the opposite end thereof there has been provided another flange 12 which is connected to the return and/or suction pipe or conduit of the system, not shown, for it forms no part of the present invention. The flange 13 with its neck 14 is positioned substantially midway of the height of the body member and has connected thereto the discharge pipe or conduit of the impeller, per se, which is the supply pipe or conduit of the system, also not shown for it forms no part of the present invention.

The motive force of the present invention, as shown in the drawings, consists of an electrical motor 15 having centrally located therein a shaft 16 which is formed integral with the circulator or agitator shaft 17.

Secured to the lower end or under surface of the motor 15 is the upper flange 18 of a spacer member, indicated in its entirety by the reference numeral 19, having a central, sleeve-like, body portion 20 and diametrically opposed strengthening ribs or arms 21 and 22 for spacing the said upper flange 18 from the second or lower flange 23. The upper flange is secured or connected to the motor 15 by any suitable or desirable means such as by bolts 24.

The lower flange 23 is likewise suitably connected by means of bolts 25 to a closure plate or ring indicated in its entirety by the reference numeral 26, which in turn is fastened to the flange 11 of the circulator or agitator body 10 by bolts 27'. The construction of the closure plate is such that the diameter of its attaching flange 28 is equal to the diameter of the flange 11 of the body 10. The closure plate 26 has disposed above the attaching flange 28 a second flange 29 and into which is threaded the bolts 25 for securing thereto the connecting or spacing member 19, with said closure plate flanges 28 and 29 connected to one another by a plurality of arms 30. The arms 30 are spaced from one another to provide between them spaces for atmospheric communication of the closure plate for a purpose later to be made clear. Interiorly of the attaching flange 28 is an integral web 31 having a central aperture 32 in alignment with an aperture 33 in the flange 29 for the motor-impeller shaft 16—17.

Depending from the undersurface of the closure plate 26, specifically, from the undersurface of the web 31, is a slinger seal plate 34. The seal plate 34 may be formed integral with the web 31 or secured thereto in any suitable or desirable manner, preferably, by bolts or screws 35 which extend from the closure plate upper flange 29, which has recesses therein to receive the heads of the said bolts or screws 35. As will be seen from Figs. 2 and 3 the bolts or scews 35 have their heads beneath the flange 22 of the spacing or connecting housing 19 and which flange 22 prevents inadvertant backing off of said bolts or screws 35.

The shaft 17 extends to the bottom of the circulator or agitator housing 10 and has at its lower end an impellor or agitator 36 secured in any manner suitable and desirable as by a nut 37. This impellor or agitator 36 is formed to a diameter to closely approximate the inner diameter of the housing or T 10. It will be appreciated that the actuation of the impeller or agitator 36 causes the liquid to rise in the housing or body member 10 for discharge through the stem 14 and that this liquid will or may rise to the closure plate 26. In order to prevent leakage along the shaft 17 and through the closure plate, the shaft has secured thereto a slinger seal, indicated in its entirety by the reference numeral 38, which cooperates with the slinger seal plate 34.

The slinger seal 38 may be secured to the shaft 17 in any suitable or desirable manner, such as by providing the shaft with a slightly tapered portion 39 on which the said slinger seal is driven as shown in Fig. 3. Specifically, the slinger seal comprises a hub 40 depending from the seal body portion 41 on the upper surface of which is a series of radial blades or fins 42 projecting upwardly from the body portion 41 toward and to be in close proximity to or slide on the opposed surface of the slinger seal plate 34. By this construction there is provided between the slinger body portion 41 and seal plate 34 a series of pockets between each pair of adjacent blades or fins 42 that act similarly to a pump impeller in outwardly throwing fluid. As seen from Fig. 4 the radial fins or blades 42 extend radially outwardly from the shaft 17 to the circumference of the slinger body portion 41 and are spaced apart to form above mentioned pockets or passages 43 through which any liquids contained therein are thrown off or discharged. It is to be here noted that the radial fins or blades need not be as shown in Fig. 4 but may be arcuately or otherwise formed so as to increase or decrease the amount of outward force to be developed.

In order to properly support the shaft 17 for rotation, the connecting housing 19 is provided inwardly of the lower face of the bottom flange 23 with a recess 44 receiving therein a ball bearing 45 held in operative position by a nut 46 threaded on the said shaft and disposed in the aperture 33 in the closure plate flange 29. The bearing 45 is positioned on a seat formed at the base of the recess 44 as clearly illustrated in Fig. 2.

The operation of the circulator is believed obvious since the application of current to the motor 15 will cause the rotation of the motor-pump shaft 16—17 and thereby cause the impeller to rotate and circulate the liquid in the system. Since the system is closed the liquid in the housing is always at a point above the neck of the outlet 14 wherefore a rotation of the impeller immediately causes a circulation.

With the rotation of the shaft 17 as pointed out above there would be a rotation of the slinger seal member and any liquid that would be contained in the pockets or passages 43 of the said member or would be on the undersurface of the slinger seal body portion would be thrown off and further rotation would prevent its return. It is now believed evident that there would be no leakage of the liquid from the system that would be in the vicinity of said slinger seal member.

The rotation of the slinger seal, acting similar to a pump impeller, sets up a centrifugal force preventing a liquid from passing above or beyond the same thereby preventing leakage through the closure plate. In the event, however, that leakage does occur it will be discharged, by gravity, through the passageways between the arms 30 of the closure plate. This discharge or leakage notifies the operator of improper operation of the agitator or impeller and at the same time prevents the leakage from continuing upwardly through the connecting or spacing housing to the motor.

It is now believed evident that there has been provided a circulator for a closed liquid system in which leakage or escape of liquid from the housing is reduced to a minimum and in the event that there is a leakage of liquid from the system it can cause no damage to the motor and will give notice to the operator of the faulty condition of the machine. It is further noted that the foregoing description of the circulator otherwise fullfills the objects initially set forth.

What is claimed is:

1. In a device of the class described a circulator body having an open upper end, a centrally apertured closing plate for closing the said circulator body open upper end, an impeller shaft extending through the closing plate aperture and into the circulator body, a seal plate carried by the closing plate surrounding the impeller shaft and downwardly projecting from the closing plate into the circulator body, screws projecting from the closing plate for replaceably securing the seal plate in position, and a slinger seal carried by the impeller shaft having a flat under surface and upstanding ribs on its upper surface, said ribs extending in a radial direction from the shaft to the outer perimeter thereof and said ribs having their upper edges in sliding contact with the seal plate to form centrifugal force generating pockets acting radially outward of the shaft.

2. In a device of the class described a circulator body having an open upper end, a centrally apertured closing plate for closing the said circulator body open upper end, an impeller shaft extending through the closing plate aperture and into the circulator body, a seal plate carried by the closing plate surrounding the impeller shaft and downwardly projecting from the closing plate into the circulator body, screws projecting from the closing plate for replaceably securing the seal plate in position, a slinger seal carried by the impeller shaft having a flat under surface and upstanding ribs on its upper surface, said ribs extending in a radial direction from the shaft to the outer perimeter thereof and said ribs having their upper edges in sliding contact with the seal plate to form centrifugal force generating pockets acting radially outward of the shaft, and said closing plate having thereabove a mounting flange connected with the closing plate by arms with space therebetween for discharge of any leakage past the closing plate.

ALOIS H. RUTHMAN.
    WILLIAM H. MAHANEY.

REFERENCES CITED

The following references are of record in the file of this patent:

UNITED STATES PATENTS

| Number | Name | Date |
|---|---|---|
| 845,701 | Moore | Feb. 26, 1907 |
| 1,460,809 | Boomershine | July 3, 1923 |
| 1,504,658 | Ulmer | Aug. 12, 1924 |
| 1,556,656 | Wilfley | Oct. 13, 1925 |
| 2,143,032 | Ruthman | Jan. 10, 1939 |

FOREIGN PATENTS

| Number | Country | Date |
|---|---|---|
| 16,666 | Great Britain | of 1909 |
| 687,654 | France | Apr. 29, 1930 |